J. M. BALDWIN.
Grinding Mill.
No. 54,486.
Patented May 8, 1866.
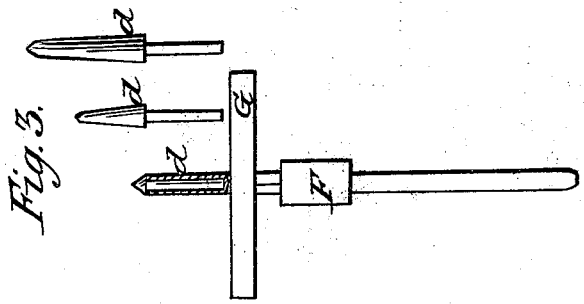
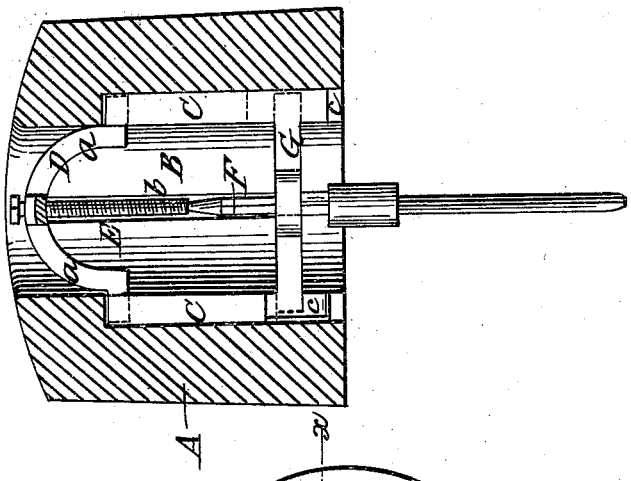
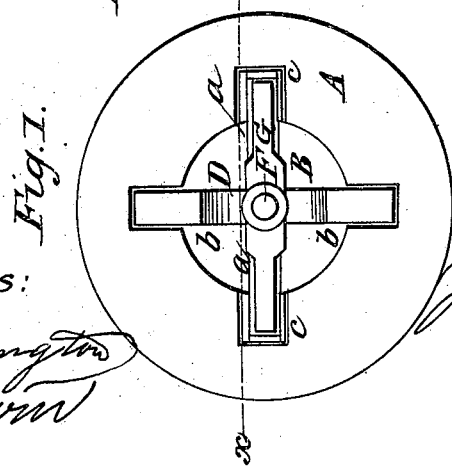

UNITED STATES PATENT OFFICE.

J. W. BALDWIN, OF SIDNEY, NEW JERSEY.

IMPROVEMENT IN GRINDING-MILLS.

Specification forming part of Letters Patent No. 54,486, dated May 8, 1866.

*To all whom it may concern:*

Be it known that I, J. W. BALDWIN, of Sidney, Hunterdon county, State of New Jersey, have invented a new and useful Improvement in Millstones; and I do hereby declare that the following is a full, clear, and exact description thereof, which will enable others skilled in the art to make and use the same, reference being had to the accompanying drawings, forming part of this specification, in which—

Figure 1 is a face view of a runner or upper millstone with my improvement applied to it; Fig. 2, a vertical central section of the same, $x$ $x$, Fig. 1, indicating the line of section; Fig. 3, detached view of the spindle and driver with removable points, showing a modification of the invention.

Similar letters of reference indicate like parts.

This invention consists in providing the upper millstone, or "runner," as it is technically termed, with an adjustable spindle so arranged that as the face of the runner wears by use the spindle may by a simple manipulation be vertically shortened in the eye of the runner.

The present practice is to secure the bail firmly in the eye of the runner, and when the face of the latter is worn off a little—say one inch and a half—the bail requires to be detached and secured farther up within the eye, so as to be out of the way of the grinding-surfaces of the two stones. This is attended with considerable trouble. The niches or grooves in the side of the eye in which the ends of the bail are fitted must be cut deeper or farther into the side of the eye to admit of the bail being adjusted farther up within the same, and the ends of the bail then secured in the niches or grooves by pouring melted lead therein. This trouble is not the only difficulty attending the old or present mode of securing the bail in the eye, for in every new adjustment of the bail the balance of the runner is liable to be lost, and that requires to be restored, which is frequently attended with more trouble than in adjusting the bail.

My invention consists in having the niches in the eye which receive the ends of the bail cut as deep as it is possible to have the bail fitted in the eye, and having a screw pass through the center of the bail to rest on the top of the spindle, or by having the spindle provided with adjustable points, all arranged as hereinafter set forth, whereby the adjustment of the spindle for the purpose specified may be effected with the greatest facility.

A represents the upper millstone or runner, and B the eye thereof. C C C C are the niches or grooves which are cut at opposite points in the side of the eye to receive the ends of the bail. The niches or grooves are cut of such a depth or height as to admit of the adjustment of the bail to its fullest extent within the eye. (See Fig. 2, in which the ends of the bail D are shown in the upper ends of the niches or grooves.)

The bail D may be of the usual form, and provided with two pairs of arms, $a$ $a$, $b$ $b$, to serve as bearings for the bail; but the arms $a$ $a$ do not extend down as far as the arms $b$ $b$. The arms $a$ $a$ are at right angles to the arms $b$ $b$.

E is a screw which passes centrally through the top of the bail D and rests upon the top of the spindle F, and G is the driver, which is fitted on the spindle F as usual, and has its ends in cast-iron sockets $c$ $c$, placed in two of the niches or grooves C C, at opposite points in the eye.

From the above description it will be seen that as the face of the runner A wears the bail D and stone A may be lowered by simply turning the screw E.

Instead of the screw E, the spindle F may be provided with removable points $d$, of different lengths to fit into its top, (see Fig. 3,) the difference in the length of the points being an inch and a half, which is about the distance the spindle is shortened at each time. I prefer, however, the screw, as being more convenient.

Having thus described my invention, I claim as new and desire to secure by Letters Patent—

The screw E, or equivalent detachable points $d$, combined with the spindle F and bail D, and arranged with the runner A, substantially in the manner as and for the purpose herein set forth.

The above specification of my invention signed by me this the 11th day of January, 1866.

J. W. BALDWIN.

Witnesses:
W. F. MCNAMARA,
ALEX. F. ROBERTS.